US010902322B2

(12) United States Patent
Sodhani et al.

(10) Patent No.: US 10,902,322 B2
(45) Date of Patent: Jan. 26, 2021

(54) CLASSIFICATION TRAINING TECHNIQUES TO MAP DATASETS TO A STANDARDIZED DATA MODEL

(71) Applicant: Adobe Inc., San Jose, CA (US)

(72) Inventors: Shagun Sodhani, Delhi (IN); Balaji Krishnamurthy, Noida (IN)

(73) Assignee: ADOBE INC., San Jose, CA (US)

( * ) Notice: Subject to any disclaimer, the term of this patent is extended or adjusted under 35 U.S.C. 154(b) by 854 days.

(21) Appl. No.: 15/660,547

(22) Filed: Jul. 26, 2017

(65) Prior Publication Data

US 2019/0034801 A1     Jan. 31, 2019

(51) Int. Cl.
  *G06N 3/08* (2006.01)
  *G06N 20/00* (2019.01)
  *G06N 20/10* (2019.01)
  *G06N 3/04* (2006.01)

(52) U.S. Cl.
  CPC ........... *G06N 3/088* (2013.01); *G06N 3/0454* (2013.01); *G06N 20/00* (2019.01); *G06N 20/10* (2019.01)

(58) Field of Classification Search
  CPC ....... G06N 20/00; G06N 20/10; G06N 3/0454
  See application file for complete search history.

(56) References Cited

U.S. PATENT DOCUMENTS

2015/0170055 A1\* 6/2015 Beymer ................. G06N 20/00
                                                706/12

OTHER PUBLICATIONS

Guo, Honglei et al.; Address Standardization with Latent Semantic Association; 2009; ACM; KDD'09; pp. 1155-1163. (Year: 2009).\*
AlQuraishi, Mohammed; ProteinNet: a standardized data set for machine learning of protein structure; 2019; BMC Informatics; pp. 1 -10. (Year: 2019).\*
Kiros , "Skip-Thought Vectors", University of Toronto, Canadian Institute for Advanced Research, Massachusetts Institute of Technology, 11 pgs., Jun. 22, 2015.

\* cited by examiner

*Primary Examiner* — Stanley K. Hill
(74) *Attorney, Agent, or Firm* — Kilpatrick Townsend & Stockton LLP

(57) ABSTRACT

A standardized data model ("SDM") includes standardized data types that indicate classifications of data elements. In a data service platform, such as a marketing data platform, a data standardization module classifies received data elements. One or more components included in the data standardization module are trained using supervised or unsupervised learning techniques to classify received data elements into a standardized data type included in the SDM. In some cases, an output of an unsupervised learning phase is provided as an input to a supervised learning phase. In some cases, a classified data element is modified by the data standardization module to indicate the standardized data type into which the data element is classified.

20 Claims, 8 Drawing Sheets

CLASSIFICATION TRAINING TECHNIQUES TO MAP DATASETS TO A STANDARDIZED DATA MODEL

FIELD OF THE INVENTION

This disclosure relates generally to the field of training neural networks, and more specifically relates to training a neural network classifier to standardize descriptions of data elements.

BACKGROUND

Data service platforms may receive collections of data from many different sources, and may provide services to users of the platform. The data that is received by the data service platform may be used as part of services that are offered by the platform. In some cases, a collection of data is used by multiple services that are offered by the platform, and the various services may operate based on the collection of data being presented in a standardized manner.

For example, a data service platform receives collections of data from multiple users that use the services provided by the data service platform. Each of the users may provide data collections that are generally similar with similar semantic content, but which have different details. For example, the collections of data generally describe data that is received from customers of the users, and include generally similar types of data, such as data elements that describe the customers' identification information, navigation choices, or conversion choices.

However, each data collection that is received may label or describe the data elements in different ways. For example, a first data collection labels a customer's identification information using an attribute called Customer_Identification, while a second data collection labels a customer's identification information using an attribute called Cust_ID. Thus, semantically similar data elements is labeled or described using different names, descriptions, or other indications.

Present attempts to provide standardized data are inadequate for data service platforms that have access to very large quantities of data. Some attempts to provide standardized data include providing a user interface by which the user may indicate a classification of a data attribute. However, such attempts at manual efforts are inappropriate for collections of data that are large, possibly including many thousands of data attributes and millions of individual records that are categorized under the data attributes. Attempting to manually classify each one of many thousands of data attributes would require prohibitive amounts of a user's resources. In addition, some efforts have been made to provide a standardized schema of data attributes, by which new collections of data may be organized. However, such schemas are not helpful for existing data collections, or collections that have been organized by an alternative standardized schema.

Thus, it is desirable to develop techniques by which large quantities of data attributes may be classified based on the semantic content of each data attribute. In addition, it is desirable that such classification techniques may be used on diverse collections of data attributes, such as collections that have been developed by different users or in accordance with different standardization schemas. Furthermore, it is desirable to develop a standardized data model based on the classification of data attributes.

SUMMARY

According to certain embodiments, a data services platform, such as a marketing data platform, includes a data standardization module. The data standardization module accesses sets of training elements that include multiple training attributes. In some cases, groups of the training attributes have a similarity (e.g., a semantic similarity, a similarity of the type of data represented by the attributes). The data standardization module transforms the training element sets into training vectors. A distance between two or more of the training vectors is determined. The standardization module trains a classifier to assign groups of the training vectors to a standardized data type based on the determined distances between the training vectors.

In some embodiments, the data standardization module receives sets of input data elements, such as from a user of the data service platform. The data standardization module applies the classifier to the sets of input data elements by transforming the sets of input data elements into input vectors, and determining a distance between each input vector and the training vectors. Based on the determined distance, the data standardization module modifies each input data element set to include an attribute indicating one of the standardized data types. In some cases, the data standardization module provides the modified input data element set to an application, such as an application using the data service platform.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
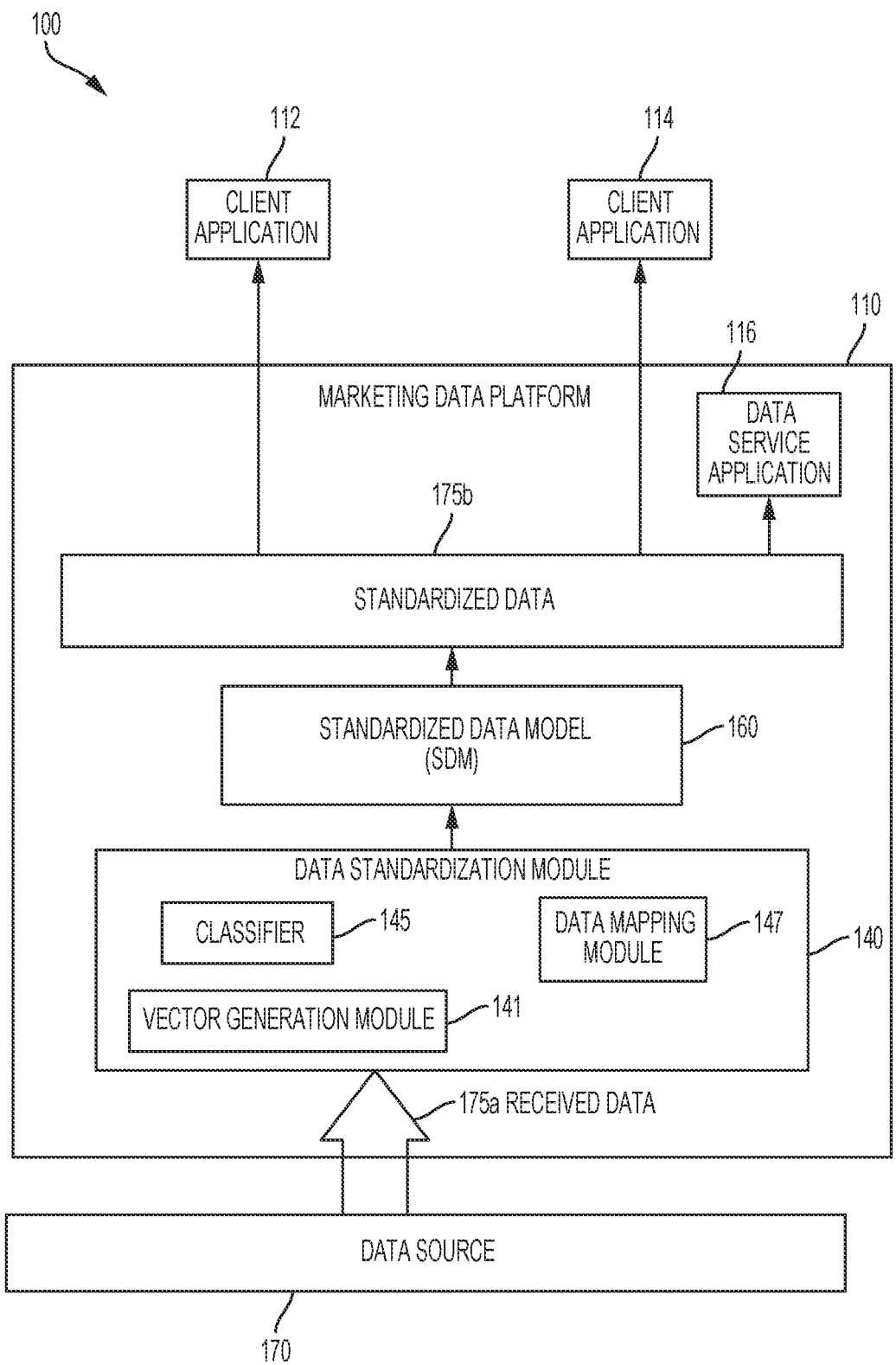
FIG. 1 is a block diagram depicting an example of a system capable of determining standardized data types for received data elements, according to certain embodiments.

As discussed above, prior techniques for standardizing data are inadequate for large quantities of data attributes, or data attributes that are received from diverse data sources. Certain embodiments described herein provide techniques for training a classifier to identify a standardized attribute type for a data element set, and for modifying the data element set to include the identified standardized attribute type.

The following example is provided to introduce certain embodiments of the present disclosure. In this example, a data service platform, including a data standardization module and a standardized data model ("SDM"), receives data from a data source. The received data includes non-standardized data, such as duplicated data that is organized by multiple formats or naming schema. The received data incudes data element sets including attributes, such as data elements that indicate a category of data (e.g., database records, data fields, column headers, column descriptions). In some cases, some or all of the data element sets are mapped, by a data mapping module, to a standard data schema, such that the mapped data is categorized to a namespace based on a template.

The data standardization module classifies the data element sets to standardized data types that are included in the SDM. The data element sets are classified based on outputs of one or more neural networks included in the data standardization module. For example, based on the received data, a vector generation module generates vectors representing the semantic content of each data element set. In some cases, the generated vectors represent the namespace of a data element sets mapped to a standard data schema. The vectors are projected into a vector space, and the distance between two or more of the projected vectors is determined. Based on the distance between the vectors, a classifier assigns groups of the vectors to respective standardized data types that are included in the SDM. Data element sets associated with the vectors are modified to indicate the respective standardized data types. The SDM is updated based on modifications to the classifications of the data element set, such as by a correction received via an input to a user interface.

The one or more neural networks included in the data standardization module are trained using supervised or unsupervised learning techniques. A first neural network included in the vector generation module is trained based on a phase of unsupervised learning, such by generating training vectors for large quantities of training element sets (e.g., words or phrases). A relatively small quantity of the training element sets are associated with respective known standardized data types. The training vectors are projected to the vector space. A second neural network included in the classifier is trained based on a phase of supervised learning, such by assigning groups of the training vectors to standardized data types, based on the known standardized data types associated with the relatively small quantity of training element sets. An output of the first neural network, such as the projected vectors, is provided to the second neural network as an input.

As used herein, the term "data service platform" refers to a software environment in which one or more users access one or more services that are included within the data service platform. In some embodiments, a data service platform is provided via coordinated functions of one or more processing, memory, and/or storage devices. Additionally or alternatively, a data service platform is provided as a virtual service, such as a platform provided via a network (e.g., "cloud service"). As used herein, the term "marketing data platform" refers to a type of data service platform that includes services related to marketing data.

As used herein, the terms "standardized data model" and "SDM" refer to a model or set of models including standardized descriptions of data types. In some cases, an SDM is developed based on classifications of data attribute sets, such as classifications performed by a classifier. Additionally or alternatively, an SDM is accessible by a classifier, such that the classifier operates based in part on information included within the SDM. The term "SDM entity" is used herein to refer to a given classification within the SDM. In some cases, an SDM entity is a particular data type (e.g., "Left Mouse Button Click"). Additionally or alternatively, an SDM entity is a group of related data types (e.g. "Customer Information"). In some embodiments, an SDM is stored or provided by a data service platform.

As used herein, the term "classifier" refers to a neural network that is capable of determining a classification of an input, such as a data element set. In some cases, the classifier is capable of improving its determined classifications based on previous classifications or additional inputs. Examples of neural networks included in a classifier include, without limitation, a recursive neural tensor network, a support vector machine, or any other suitable type of neural network.

In some cases, a neural network is trained via supervised learning, in which one or more iterations of a given neural network are configured with various parameters or settings, and the output of the iterations are compared based on performance goals, such as accuracy, speed, or other performance metrics. Additionally or alternatively, a neural network is trained via unsupervised learning, in which a neural network is provided with a training dataset (e.g., a body of known data) and provides output based on the training dataset. In some cases, a neural network is trained via both unsupervised and supervised learning. For example, a neural network is provided with a training dataset for a first phase of unsupervised learning, and the trained neural network is then modified in a second phase of supervised learning, during which various iterations of the trained neural network are configured and compared. Additionally or alternatively, multiple neural networks are trained, such as a first neural network trained using a phase of unsupervised learning, and a second neural network trained using a phase of supervised learning. In some cases, the first and second neural networks have coordinated training. For example, the values of some parameters are shared between the first and second neural networks. Additionally or alternatively, the second neural network receives one or more outputs from the first neural network. In some cases, a neural network (including a trained neural network) is modified based on received feedback, such as inputs indicating mistakes in the output of the neural network.

As used herein, the term "training data" refers to a body of data that is provided to a neural network, such as a classifier, during one or more training phases. In some cases, the training data includes data element sets having known standardized attribute types. Additionally or alternatively, the training data includes data element sets arranged as tuples of information.

As used herein, the term "tuple" refers to a set of data items, and the term "attribute" refers to an item of the set. In some cases, a tuple includes multiple data attributes. For example, a tuple of training data elements includes a name attribute, a description attribute, and an assigned standardized data type attribute. Additionally or alternatively, a tuple of input data elements includes a name attribute and a description attribute, and a tuple of modified input data elements includes a name attribute, a description attribute, and a identified standardized data type attribute. For convenience, and not by way of limitation, a tuple is referred to herein using the nomenclature <Attribute_1, Attribute_2, Attribute_3, . . . > where each of the numbered attributes represents a data element.

As used herein, the term "data element" refers to descriptive information that is used as a category or label for information or data that is stored within that category. Examples of data elements include, without limitation, headers (such as a column header in databases), labels (such as labels for rows or records in databases), variable names, descriptive phrases (e.g., "tags"), or other types of information. In some cases, a data element includes text information, such as natural language words (e.g., "number of conversions per customer") or non-language text (e.g., "Conv_Rate").

As used herein, the term "vector" refers to a quantitative representation of information included in a data element. As used herein, the term "vector space" refers to a representation of a spatial region in which one or more vectors may have a spatial location. In some embodiments, a vector, a vector space, or both have a higher dimensionality (e.g., tens or hundreds of dimensions). For example, a vector within the vector space includes one or more traits, such as a position, a magnitude, a quantity of dimensions, a value associated with each dimension, or other suitable traits. In some cases, a vector, a vector space, or any associated traits are represented by one or more data structures (including data structures not intended for human interpretation). Additionally or alternatively, each vector has one or more data values indicating the vector's respective traits.

As used herein, the term "semantic content" refers to information included within a data item. Additionally or alternatively, semantic content refers to a category of information included in a data item. For example, data items for information such as a name, email address, or shipping address include semantic content that is related to customers' personal information. In some cases, semantic content of two or more data items has a similarity. For example, a data item for a shipping address has a higher degree of semantic similarity to a data item for a billing address, and a lower degree of semantic similarity to a data item for a telephone number. Semantic similarity is determined by any suitable method, such as a cosine similarity.

As used herein, the term "standard data schema" refers to a template for data types. In some cases, data is mapped to one or more standard data schema. Additionally or alternatively, data that is mapped to a standard data schema is syntactically diverse (e.g., has a wide variety of descriptive labels or informational content), is not normalized (e.g., does not conform to normalization formats, such as for a database), and is duplicative (e.g., includes multiple data items having similar or identical semantic content). In some cases, data that is mapped to a standard data schema is mapped to one or more namespace, such as a universal namespace. Additionally or alternatively, mapping is accomplished via predefined template for common data types, or with custom mapping for variable and non-standard data. For example, a user of a data service platform provides a custom mapping for a data type that is related to a particular category of data used by the platform user.

Referring now to the drawings, FIG. 1 is a block diagram depicting an example of a system 100 capable of determining standardized data types for received data elements. The system 100 includes a marketing data platform 110 and a data source 170. The marketing data platform 110 receives data 175a from the data source 170, and the received data 175a is used within the marketing data platform 110. For example, the marketing data platform 110 provides standardized data 175b based on the received data 175a. For convenience herein, and not by way of limitation, the received data 175a and the standardized data 175b are referred to collectively as data 175. In some cases, some portions of standardized data 175b are similar or identical to portions of the received data 175a, such as data having identical values but modified organization. Additionally or alternatively, some portions of data 175b are modified based on the received data 175a, such as data elements having a classification within an SDM. Additionally or alternatively, some portions of data 175b are derived from the received data 175a, such as derived data indicating a customer's product preferences based on that customer's purchase history.

In system 100, marketing data platform 110 provides data 175 to applications or additional software functions. In some cases, the marketing data platform 110 provides data 175 to applications operating within the context of the marketing data platform 110, such as data service application 116. Additionally or alternatively, the marketing data platform 110 provides the data to applications associated with the marketing data platform 110, such as client applications 112 or 114.

Marketing data platform 110 includes a data standardization module 140. The data standardization module 140 receives at least a portion of received data 175a. The data standardization module 140 modifies data elements included in data 175a to indicate a standardized data type. In some embodiments, the standardized data type is included in the SDM 160. For example, the data standardization module 140 classifies, such as by classifier 145, multiple data elements into standardized data types, such as standardized data types included in the SDM 160. In some cases, the modified data elements are associated with the SDM 160. For example, the modified data elements include an indication (e.g., a reference, a pointer, an address) of a particular standardized data type that is included within the SDM 160. The modified data elements with the indications are included, for example, in standardized data 175b.

In some embodiments, data standardization module 140 includes a data mapping module 147. Data mapping module 147 maps the received data 175b to a standard data schema. The standard data schema includes one or more namespaces, and data 175b is mapped via templates, such as templates for common data types or customized templates provided by a user of the marketing data platform 110. In some cases, the mapped data includes duplicated data, non-normalized data, or syntactically diverse data. Additionally or alternatively, the mapped data is provided to one or more of vector generation module 141 or classifier 145, which classifies data elements of the mapped data based in part on the standard data schema to which the data is mapped. In some embodiments of system 100, the data mapping module 147 is omitted, and the received data 175a is provided to classifier 145 without having been mapped to the standard data schema.

Within marketing data platform 110, data standardization module 140 includes vector generation module 141 and classifier 145. Based on a data element (such as an element included in received data or mapped data), vector generation module 141 generates one or more vectors representing the semantic content of the data element. The classifier 145 is applied to data elements (such as an element included in received data or mapped data) that are accessed by data standardization module 140. Additionally or alternatively, classifier 145 determines a similarity between a given data element and other data elements that are assigned to a standardized data type. Based on the similarity, it is determined that the given data element has the standardized data type of the other data elements. In some cases, the similarity is determined based on semantic content of the given data element, such as by comparing a vector representing semantic content of the given data element to vectors representing semantic content of the other data elements. The data standardization module 140 indicates standardized data types for the classified data elements. For example, the data standardization module 140 modifies each classified data element to include an attribute indicating the respective standardized data type of the data elements.

In some embodiments, classifications are included in SDM 160. For example, data standardization module 140 provides the classified data elements (or indications of the elements, such as pointers or addresses) to SDM 160. The SDM 160 builds (or receives) a model having standardized descriptions of the standardized data types. For example, SDM 160 builds a model of the standardized descriptions based on the classifications of the classified data elements. Additionally or alternatively, SDM 160 receives a model of the standardized descriptions, such as a model built by an application within the marketing data platform 110. In some cases, the SDM 160 includes a model that is based on both classifications received from classifier 145 and on information (including classification information) received from other applications within the marketing data platform 110. For example, SDM includes a model based on one or more namespaces included in a standard data schema, such as a schema used by data mapping module 147.

The marketing data platform 110 associates the SDM 160 with the standardized data 175b. Some data elements that are included in data 175b have classifications determined by data standardization module 140. Additionally or alternatively, some data elements included in data 175b are associated with one or more of the standardized descriptions included in the SDM 160. For example, an application, such as data service application 116, derives data based on a portion of the received data 175a. Some or all of the derived data is associated with standardized descriptions included in SDM 160. In some cases, the derived data is associated with the standardized descriptions based on a classification of the received data 175a on which the derived data is based.

In system 100, some or all of data 175 is provided to applications. For example, client applications 112 and 114 and data service application 116 receive a portion of the standardized data 175b. In some cases, the applications receive other data, such as a portion of the received data 175a. In some embodiments, applications such as 112, 114, and 116 provide services or functions (e.g., "services") based on a portion of the data 175. For example, applications operating within the context of marketing data platform 110, such as data service application 116, provide services that are associated with the marketing data platform 110, such as additional modifications to the data 175, derivation of information based on the data 175, communication with other applications within or associated with marketing data platform 110, or any other suitable service. In some cases, services provided by data service application 116 are accessible only by other applications (e.g., instead of by end users).

Additionally or alternatively, applications that are associated with marketing data platform 110, such as client applications 112 and 114, provide services based on data or services provided by marketing data platform 110. For example, client applications 112 or 114 have access to data 175 and services offered by data service application 116. Client applications 112 and 114 provide services based on the marketing data platform 110. For example, client application 112 modifies a portion of data 175 in a way that is consistent with business operations of an operator of client application 112. Additionally or alternatively, client application 114 accesses services offered by data service application 116 to provide information to customers of an operator of application 114. In some cases, services offered by client applications 112 and 114 are accessible by end users, such as customers of an operator of client application 112 or 114.

Figure 2:
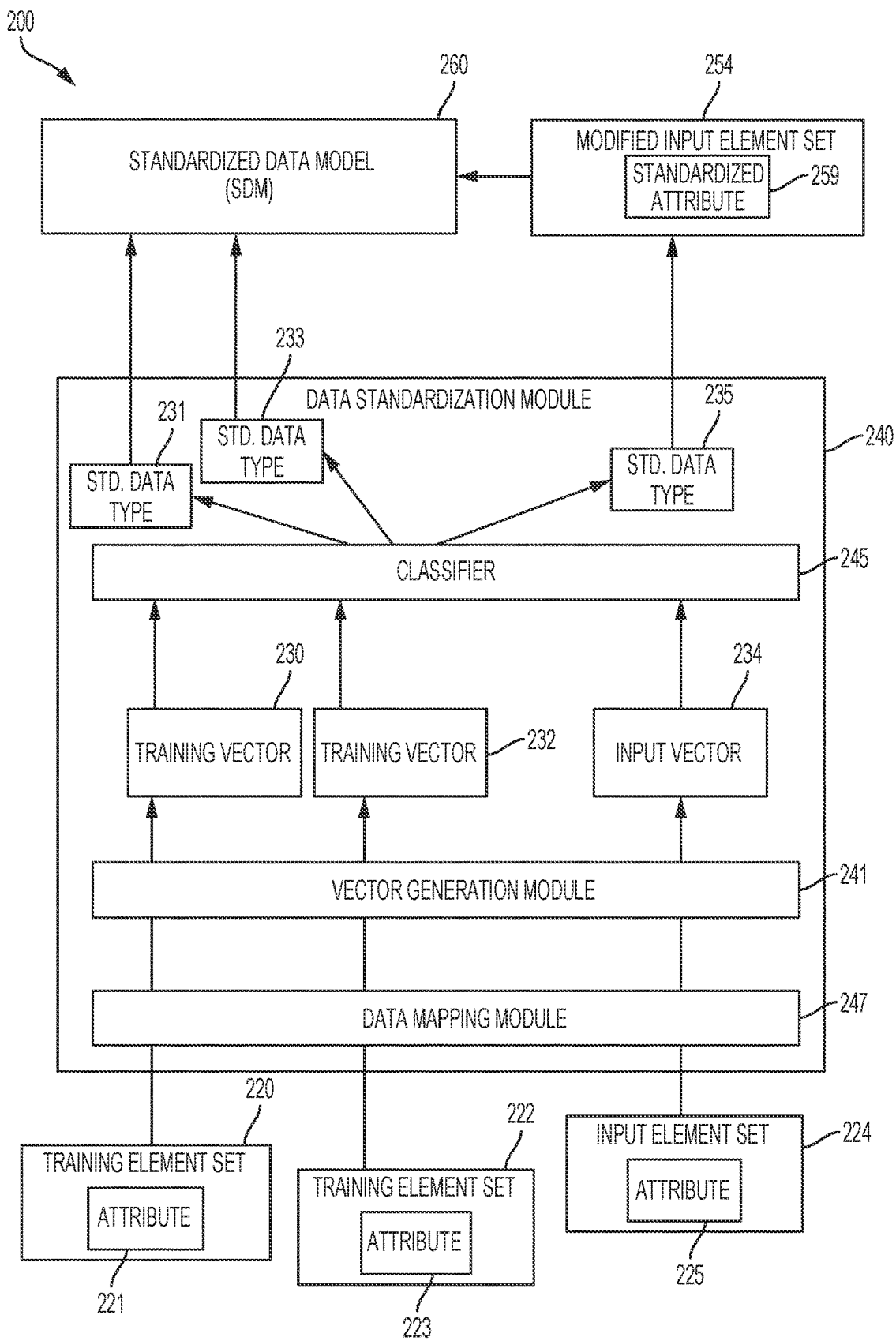
FIG. 2 is a block diagram depicting an example of a system capable of developing a model including standardized descriptions of data attribute types, according to certain embodiments.

FIG. 2 is a block diagram depicting an example of a system 200 in which a model including standardized descriptions of data attribute types is developed. System 200 includes an SDM 260, a data standardization module 240, and multiple element sets, such as training element set 220, training element set 222, and input element set 224. In some embodiments, the SDM 260 and the data standardization module 240 are implemented within a data service platform, such as marketing data platform 110. Additionally or alternatively, SDM 260 and data standardization module 240 are implemented within a computing system that is accessible by a data service platform.

In system 200, data standardization module 240 is capable of training one or more of a vector generation module 241, a classifier 245, or both. Additionally or alternatively, data standardization module 240 is capable of applying vector generation module 241, classifier 245, or both. For example, data standardization module 240 trains vector generation module 241 and classifier 245 based on training element sets, such as training element sets 220 and 222. Additionally or alternatively, data standardization module 240 applies vector generation module 241 and classifier 245 to input element sets, such as input element set 224. In some cases, data element sets are modified by data standardization module 240. For example, data standardization module 240 produces modified input element set 254 based on input element set 224.

In some embodiments, data standardization module receives multiple element sets, such as training element set 220, training element set 222, and input element set 224. Each element set includes one or more attributes. For example, training element set 220 includes attribute 221, training element set 222 includes attribute 223, and input element set 224 includes attribute 225. Examples of attributes included in the received element set include, without limitation, column names or column headers (e.g., from database records), field names or field descriptions, descriptive information such as short text descriptions (e.g., "tags"), organizational information (e.g., schemas previously applied to the element sets), or any other suitable attribute.

In some cases, one or more element sets are provided to a data mapping module, such as data mapping module 247. Data mapping module 247 maps the received element sets to a standard data schema. Additionally or alternatively, data mapping module maps provides one or more mapped element sets based on the respective received element sets. In some embodiments, a data mapping module is omitted from system 200.

In some embodiments, data standardization module 240 transforms the multiple received element sets based on information included in each respective element set. For example, vector generation module 241 is or includes a neural network that is capable of transforming a received element set into a vector based on semantic content of the received element set. Semantic content of a data element set includes, for example, natural language information, such as text information in a column name or in a column description. In some cases, a vector, such as a word vector, is generated using appropriate techniques (e.g., GloVe, Word2Vec, one-hot vector representations), including unsupervised or supervised learning techniques. Additionally or alternatively, a vector is modified by one or more composition techniques (e.g., averaging, recursive neural tensor network, skip-thought vectors). In some cases, a vector for a data element set is generated based on one or more attributes of the data element set.

In some cases, vector generation module 241 projects the vector of a respective element set to a location within a vector space associated with the multiple received element sets. For example, the vector space indicates a location of each respective vector that is generated based on each respective received element set. Within the vector space, the semantic content of the received element sets is represented by the generated vectors. For example, a similarity between the semantic content of two or more of the element sets is represented by a distance between the respective vectors of the elements. Distance is calculated using any suitable technique, such as a cosine comparison of two vectors, a norm, a Euclidean distance, a Manhattan distance, a Minkowski distance, or any other suitable measurement technique.

In system 200, data standardization module 240 includes classifier 245. In some embodiments, classifier 245 is or includes a neural network that is capable of determining a classification of an input. In an embodiment, system 200 is capable of training one or more of data standardization module 240, vector generation module 241, or classifier 245 using supervised learning, unsupervised learning, or both. For example, data standardization module 240 receives one or more training element sets, such as training element set 220 or training element set 222. Vector generation module 241 is trained, for example, to generate vectors based on the received training element sets, such as via unsupervised learning techniques. Additionally or alternatively, classifier 245 is trained to assign vectors to standardized data types, such as via supervised learning techniques. In some cases, one or more of vector generation module 241 or classifier 245 are already trained within system 200. For example, vector generation module 241 receives one or more input element sets, such as input element set 224, and generates an input vector based on the trained techniques to generate vectors. Additionally or alternatively, classifier 245 assigns the input vector to a standardized data type, based on the trained techniques to classify vectors.

In some embodiments, classification of element sets by classifier 245 includes comparing information that is associated with each respective element set, such as comparison of vectors generated based on element sets. For example, classifier 245 receives one or more vectors, such as training vector 230, training vector 232, or input vector 234, associated respectively with training element set 220, training element set 222, and input element set 224. In some cases, a respective position is determined for one or more of the vectors within an associated vector space. Based on the determined positions, a distance is determined between a given pair of vectors within the associated vector space. In some cases, a vector position, or a distance between vectors, or both is based on one or more respective attributes of the vectors. Additionally or alternatively, classifier 245 compares the determined distance to a threshold distance. Classification of element sets is based, for example, on the comparison of one or more determined distances to a threshold distance. The position of a vector or a distance between vectors is determined by one or more of data standardization module 240, vector generation module 241, or classifier 245.

In system 200, data standardization module 240 determines a standardized data type about the element sets based in part on the classification determined by classifier 245. For example, data standardization module 240 determines a standardized data type 231 for training element set 220, based in part on a classification of training vector 230 by classifier 245. Standardized data types 233 and 235 are determined respectively for training element set 222 and input element set 224, based on the respective classification of training vector 232 and input vector 234. In some cases, data standardization module 240 modifies an element set based on the classification by classifier 245. For example, data standardization module 240 provides modified input element set 254, based on input element set 224, classification of input element set 224, or both. Modified input element set 254 includes standardized data type attribute 259, which indicates standardized data type 235 determined for input element set 224. In some cases, modified input element set 254 includes other attributes in addition to standardized data type attribute 259 (e.g., another attribute having information similar or identical to attribute 225).

In some embodiments, data standardization module 240 provides the determined standardized data types to another component of system 200, such as SDM 260. For example, SDM 260 receives standardized data types 231 and 233 (or an indication of these) associated with training element sets 220 and 222. Based on receiving standardized data types associated with training element sets, SDM 260 determines one or more models of the standardized data types. SDM 260 (or the models) includes standardized descriptions of the data types. In some cases, the models are modified based on additional information. For example, SDM 260 modifies one or more of the models based on information received from data mapping module 247, such as information indicating a standard data schema for element sets associated with the standardized data types. Additionally or alternatively, SDM 260 modifies one or more of the models based on information associated with additional element sets, such as standardized attribute 259 included in modified input element set 254.

Figure 3:
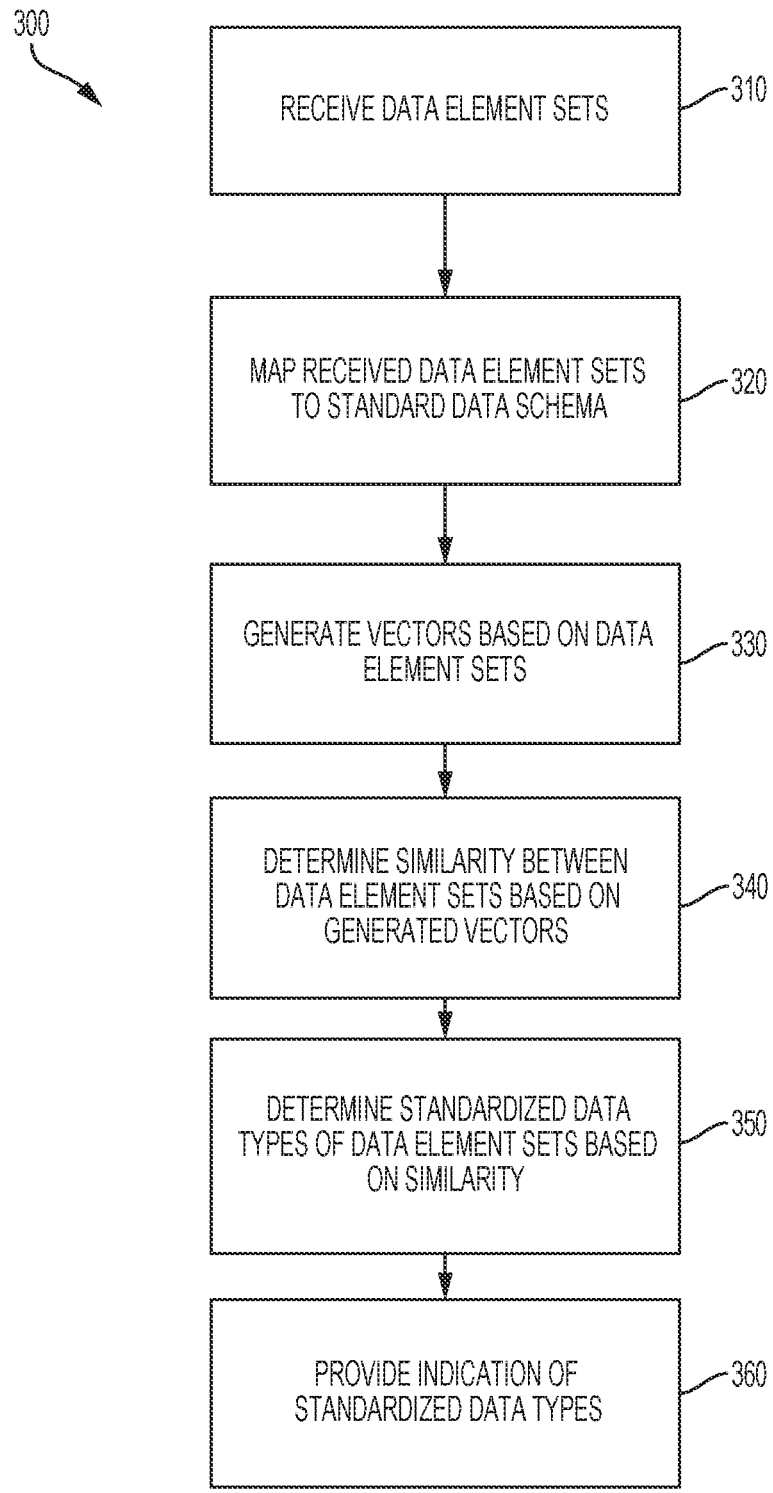
FIG. 3 is a flow chart depicting an example of a process for determining standardized data types for data elements, according to certain embodiments.

FIG. 3 is a flow chart depicting an example of a process 300 for determining standardized data types for data elements. In some embodiments, such as described in regards to FIGS. 1-2, a computing device executing a data standardization module implements operations described in FIG. 3, by executing suitable program code. For illustrative purposes, the process 300 is described with reference to the examples depicted in FIGS. 1-2. Other implementations, however, are possible.

At block 310, the process 300 involves receiving multiple data element sets. For example, a data standardization module 140 receives data element sets from data source 170. The data element sets represent, for example, training data.

Additionally or alternatively, the data element sets represent raw marketing data received from one or more users of marketing data platform 110. In some cases, the data element sets include descriptions (e.g., column names, column descriptions, headers) representing portions of the training data or raw marketing data.

In some embodiments, the data element sets represent portions of the raw marketing data that are one or more of duplicative, non-normalized, or syntactically diverse. For example, and not by way of limitation, the received data element sets represent data including customer names of the multiple platform users. A particular customer, Marie Smith, is a customer of each of the platform users. The represented data includes multiple occurrences of Marie Smith's name (e.g., duplicative data). In addition, some of the platform users store customers' first and family names together (e.g., an attribute <Customer_Name>), while some of the platform users store customers' first and family names individually (e.g., attributes <First_Name>, <Family_Name1>, <Family_Name2>), and the multiple occurrences of Marie Smith's name are stored in different organizations or data structures (e.g., syntactically diverse). Furthermore, the represented data from the multiple platform users is stored in multiple databases that do not meet database normalization guidelines (e.g., non-normalized).

At block 320, the process 300 involves mapping the received data element sets, such as to a standard data schema. For example, data mapping module 147 receives one or more of the received data element sets, and maps the received data element sets to one or more standard data schema. In some cases, the standard data schema includes namespaces. A received data element set is mapped to the namespaces, for example, based on one or more templates (e.g., a predefined template, a template defined by the platform user). For example, and not by way of limitation, the received data element sets include a first element set representing customer account identification numbers from a first platform user, and a second element set representing customer telephone numbers from a second platform user. Both the first and second element sets include an attribute <Customer_Number>, while the information represented by the respective element sets is different. The first and second element sets are mapped, such as by a data mapping module, to a standard data schema. The first element set is mapped to a namespace Identification: and the second element set is mapped to a namespace Contact_Information:

In some embodiments, operations related to block 320 are omitted. For example, an embodiment of a data standardization module may omit a data mapping module.

At block 330, the process 300 involves generating vectors based on the data element sets. For example, vector generation module 141 generates vectors based on one or more of received data element sets or mapped data element sets. Each vector is generated based on one or more attributes included in a related data element set. In some cases, the generated vectors are word vectors. For example, and not by way of limitation, a data element set has a first attribute <Customer_Name> indicating a name of a column (e.g., a column header in a database). The data element set has a second attribute <First and last names of the customer> indicating a description of the data that is stored under the first attribute (e.g., a descriptive explanation associated with the column header). One or more vectors are generated based on the data element set using one or both of the first and second attributes. For example, data standardization module 140 generates a vector based on one or more of the text items "Customer_Name," "Customer," or "Name" associated with the first attribute. Additionally or alternatively, vector generation module 141 generates additional vectors based on the text items "First," "last," "names," and "customer" associated with the second attribute. In some cases, vectors are generated based on text items having multiple words, such as "First and last names" or "of the customer." Additionally or alternatively, vectors are generated based on additional information, such as a mapping of a data element set to a standard data schema.

In some cases, generated vectors are modified. For example, vector generation module 141, or another component of system 100, applies composition techniques to word vectors. Composition techniques include, without limitation, word vector averaging, recursive neural tensor networks, skip-thought vectors, or any other suitable techniques. In some cases, vectors are modified using multiple techniques. In some embodiments, vectors are generated, modified, or both, based on training techniques, such as unsupervised learning techniques (e.g., GloVe, Word2Vec). Additionally or alternatively, vectors are generated or modified based on supervised learning techniques.

Additionally or alternatively, some or all of the generated or modified vectors are associated with a vector space. For example, each of the associated vectors has traits within the vector space, such as a position, a magnitude, a quantity of dimensions, a value associated with each dimension, or other suitable traits. In some cases, vector generation module 141, or another component of system 100, provides a data structure representing the vector space and the traits of associated vectors (including a data structure not intended for human interpretation). Additionally or alternatively, each associated vector has one or more data values indicating the vector's respective traits.

At block 340, the process 300 involves determining similarity between the data element sets. In some cases, the similarity is determined based on generated vectors, modified vectors, or both. For example, similarity between a given set of data element sets is determined based on vector traits of the respective data element sets. Data standardization module 140, for example, determines a distance between the respective vectors of the data element sets, based on the position of each vector. Distance is determined using one or more techniques, such as cosine similarity between vectors, a mathematical norm, two vectors, a norm, a Euclidean, Manhattan, or Minkowski distance, or other suitable techniques.

In some embodiments, the determined distance is compared to a threshold distance. For example, data standardization module 140 compares a distance between first and second vectors to a value of a threshold distance. Based on the comparison to the threshold distance, a similarity between the data element sets associated with the first and second vectors is determined. For example, and not by way of limitation, a first data element set including the attributes <Customer_Name> and <"First and last names of the customer"> is associated with a first vector with a first position. A second data element set including the attributes <Cust_Name> and <"Customer's name"> is associated with a second vector with a second position. A comparison of the threshold distance to the distance between the first and second vectors indicates that the threshold distance is greater or equal to the distance between the vectors (e.g., the vectors' associated distance is within the threshold distance). Based on the comparison, data standardization module 140 determines that the first and second data element sets are similar (e.g., are within a threshold level of similarity).

In some embodiments, operations related to block 340 are repeated, such as by comparing a distance between vectors to multiple threshold distances. Additionally or alternatively, further operations are performed based on the outcomes of the multiple comparisons. For example, a distance between vectors is compared to each of a first threshold distance having a relatively smaller value (e.g., indicating a shorter distance), and a second threshold distance having a relatively larger value (e.g., indicating a longer distance). Based on respective comparisons to each of the threshold distances, data standardization module 140 indicates a likelihood of similarity between data element sets associated with the vectors. Based on determining that the distance between vectors is less than or equal to the first threshold distance having the relatively smaller value, data standardization module 140 indicates a high likelihood that the associated data element sets are similar. Additionally or alternatively, based on determining that the distance between vectors is greater than the second threshold distance having the relatively larger value, data standardization module 140 indicates a low likelihood that the associated data element sets are similar. Furthermore, based on determining that the distance between vectors is greater than the first threshold distance and less than or equal to the second threshold distance, data standardization module 140 indicates an intermediate likelihood that the associated data element sets are similar. In some cases, data standardization module 140 performs additional techniques based on the determination that the distance between the vectors is in between the first and second threshold distances. For example, data standardization module 140 provides information to a user interface associated with system 100, such as a request for additional information from a user of system 100.

At block 350, the process 300 involves determining a standardized data type of a data element set. For example, based on a determination that first and second data element sets are similar, data standardization module 140 associates with the first data element set a standardized data type that is associated with the second data element set.

At block 360, the process 300 involves providing an indication of the standardized data types that are associated with one or more of the data element sets. In some cases, an SDM, such as SDM 260, is modified to indicate that a given data element set is associated with a standardized data type included in the SDM. For example, the modification of the SDM includes one or more of indicating that a given data element set is associated with a particular standardized data type, or providing a new standardized data type to the SDM. Additionally or alternatively, a data element set is modified to indicate the associated standardized data type. For example, modified input element set 254 is modified to include an standardized data type attribute 259 indicating the standardized data type 235.

Training Using Unsupervised and Supervised Learning Approaches

Figure 4:
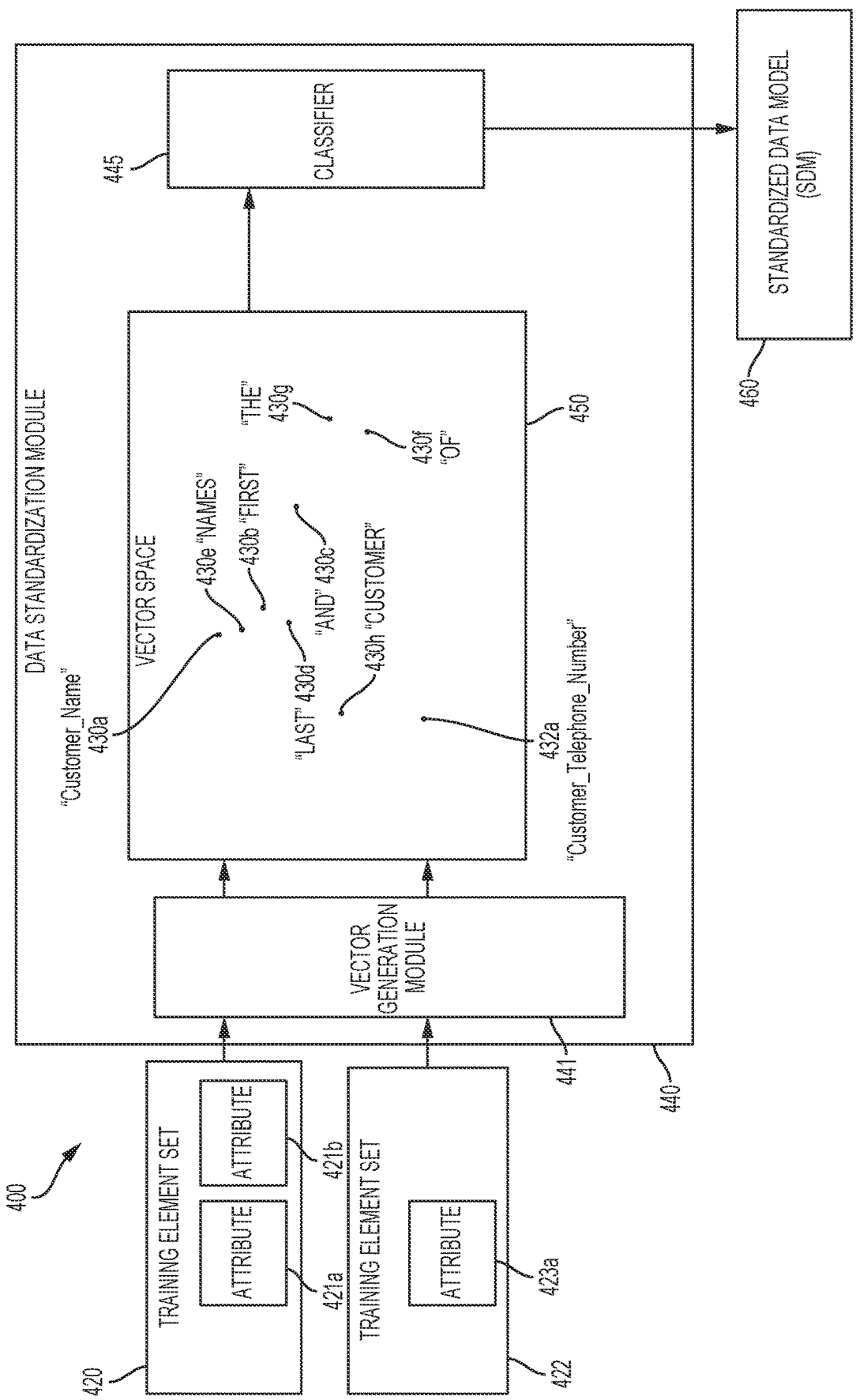
FIG. 4 is a block diagram depicting an example of a system in which one or more modules are trained to classify data element sets, according to certain embodiments.

FIG. 4 is a block diagram depicting an example of a system 400 in which one or more modules are trained to classify data element sets. In some embodiments, some or all of system 400 is included in a data standardization module, such as data standardization module 440. Additionally or alternatively, portions of system 400 are included in various components, such as components on a network, or in a distributed configuration (e.g., "cloud" configuration), or any other suitable configuration.

For convenience, and not by way of limitation, vector space 450 is represented as an area having a height and width, and vectors included in the vector space 450 are represented as points. However, other representations are possible, including representation using data structures having a higher dimensionality, or data structures not intended for human interpretation.

In system 400, multiple data element sets are received, each data element set having one or more attributes. For example, training element set 420 includes training attributes 421a and 421b. Training attribute 421a includes <Customer_Name> indicating a first column header. Training attribute 421b includes <First and last names of the customer> indicating a description of the first column. Training element set 422 includes training attribute 423a, which includes <Customer_Telephone_Number> indicating a second column header. Data element sets are received via one or more of a data source or a data mapping module, such as data source 170 or data mapping module 147 described in regards to FIG. 1. In some cases, received data element sets or included attributes are mapped to a standard data schema, as described elsewhere herein.

In some embodiments, a received data element set is transformed into one or more vectors based on the content of attributes included in the data element set. For example, data standardization module 440 transforms training element set 420 into training vectors 430a-430h. Training vector 430a is generated based on the text item "Customer_Name" included in training attribute 421a. Training vectors 430b, 430c, 430d, 430e, 430f, 430g, and 430h are generated based on the respective text items "First," "and," "last," "names," "of," "the," and "customer" included in training attribute 421b. Additionally or alternatively, training element set 422 is transformed into training vector 432a. Training vector 432a is generated based on the text item "Customer_Telephone_Number" included in training attribute 423a. In some cases, each of the training vectors 430a-430h and 432a indicate a context of the respective vector, or the text item used to generate the respective vector. For example, training vector 430e, associated with text item "names" indicates a context of the text item "names" or training vector 430e, such as an indication that "names" is preceded by "First and last" and followed by "of the customer" within attribute 421b. Additionally or alternatively, training vector 430e indicates that training vector 430e has a relationship with training vectors 430b-430d and 430f-430h, based on the training attribute 421b.

In some cases, generation of a vector is based on training techniques, such as unsupervised learning techniques to obtain vector representations of received data element sets. For example, data standardization module 440 generates training vectors 430a-430h and 432a and projects the training vectors into vector space 450 based on unsupervised learning techniques, including composition techniques. In system 400, data standardization module 440 includes a vector generation module 441 capable of receiving one or more training element sets, such as training element sets 420 and 422, and learning to generate vectors, such as training vectors 430a-430h and 432a, such that semantic information included in each training element set is represented by the respective generated vector projected within vector space 450. Based on unsupervised learning techniques, vector generation module 441 learns to generate training vectors 430a-430h and 432a such that semantic content of training attributes 421a and 421b (e.g., information about names of customers) and 423a (e.g., information about telephone numbers of customers) is represented by the respective training vectors. In some cases, vector generation module 441 includes a neural network. A neural network included in vector generation module 441 is trained to generate vectors, for example, via averaging, a recursive neural tensor network, skip-thought vectors, or other suitable unsupervised techniques.

In system 400, data standardization module 440 determines a similarity between some or all of the data element sets, such as a similarity based on semantic content included in one or more attributes of data element sets. Additionally or alternatively, the determined similarity is based on a distance between two or more vectors projected into vector space 450. In some cases, the vectors are projected into the vector space 450 such that the location of each vector is based upon the semantic content of the vector's associated data element set. For example, training vectors 430a-430h and 432a are projected into vector space 450 based on the semantic content of the respective training attributes 421a, 421b, and 423a (or portions of the attributes).

In some cases, vector generation module 441 determines a similarity of training element sets based on the distance between vectors associated with the training element sets. Additionally or alternatively, the determined similarity is compared to a threshold similarity. In some cases, values of the threshold similarity, threshold distance, or both are determined by the vector generation module 441 or data standardization module 440 during the training process. Additionally or alternatively, values of the threshold similarity, threshold distance, or both are provided, such as an input provided to system 400 via a user interface, the input indicating one or more training parameters.

In system 400, a classifier 445 assigns groups of vectors to a standardized data type based on the comparison between a threshold distance and a distance between two or more vectors in the group. In some embodiments, classifier 445 assigns groups of vectors to standardized data types during training of the classifier 445. For example, classifier 445 classifies vectors to standardized data types based on supervised learning techniques. In some cases, classifier 445 includes a neural network. Classifier 445 is trained to classify vectors, for example, via a support vector network, or other suitable supervised techniques.

In some cases, classifier 445 assigns a group of training vectors to a standardized data type based on a distance between two or more of the training vectors in the group. For example, classifier 445 assigns a group including the training vectors 430a, 430e, 430b, and 430d to a standardized data type indicating information about the given names and family names of a customer. Classifier 445 assigns the group based on, for example, each of the training vectors 430a, 430e, 430b, and 430d having a distance to one or more of the other training vectors in the group that is within the threshold distance.

In some embodiments, classifier 445 is trained to classify vectors based on additional information indicating a known standardized data type. For example, one or more of training element sets 420 and 421 include additional information, such as an additional attribute indicating a known standardized data type. Based on the additional information, classifier 445 modifies a group of vectors assigned to a standardized type, such as by removing from the group a vector that is associated with a known standardized data type different from the assigned standardized data type, or by adding to the group a vector that is associated with a known standardized data type similar or identical to the assigned standardized data type.

In system 400, data standardization module 440 determines a standardized data type for a received data element set based on the classification of one or more vectors associated with the data element set. In some cases, the standardized data type for a data element set is determined by classifier 445. Based on the group of vectors assigned to a standardized data type, the received data element sets (including raw data, such as column names or fields received from, e.g., data source 170) are associated with standardized data types included in an SDM, such as SDM 460. In some cases, SDM 460 is provided with the groups of vectors assigned to respective standardized data types. Additionally or alternatively, SDM 460 is provided with information (e.g., pointers, reference addresses, data structures) indicating which group or groups of vectors are assigned to respective standardized data type.

Figure 5:
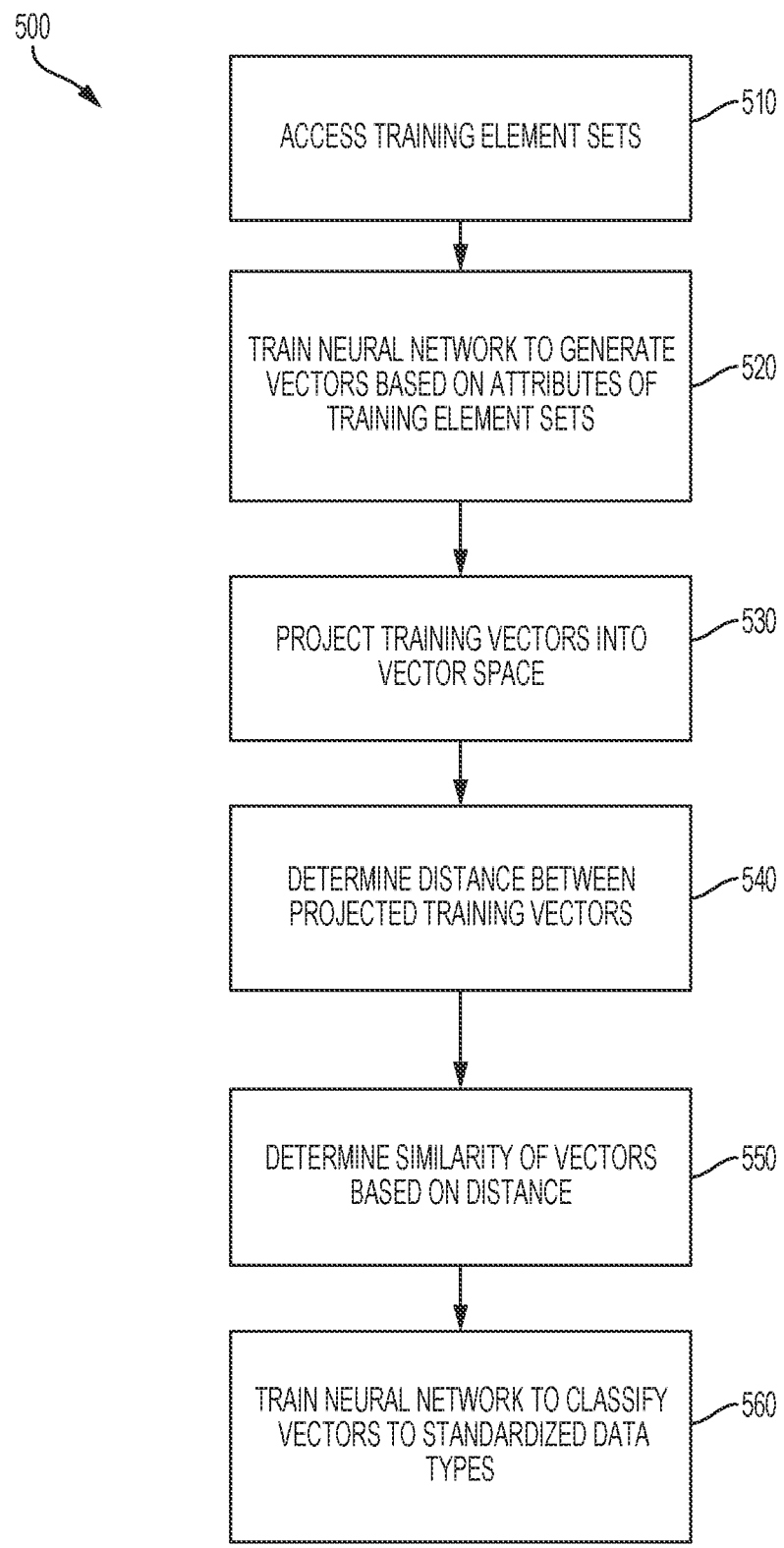
FIG. 5 is a flow chart depicting an example of a process for training a computing system to generate or classify vectors, according to certain embodiments.

FIG. 5 is a flow chart depicting an example of a process 500 for training a computing system to generate vectors, or to classify vectors, or both. In some embodiments, such as described in regards to FIGS. 1-4, a computing device executing a data standardization module, such as data standardization module 440, implements operations described in FIG. 5, by executing suitable program code. For illustrative purposes, the process 500 is described with reference to the examples depicted in FIGS. 1-4. Other implementations, however, are possible.

At block 510, the process 500 involves accessing training data element sets. For example, data standardization module 440 accesses training element sets 420 and 422, such as from a data source. The accessed training element sets include, for example, one or more attributes, such as training attributes 421a, 421b, or 423a. In some cases, some or all of the training element sets include an attribute indicating a known standardized data type associated with each respective training element set. Additionally or alternatively, the training element sets are mapped to a standard data schema, such as by a data mapping module 247.

At block 520, the process 500 involves training a neural network, such as a neural network included in vector generation module 441, to generate training vectors based on the training element sets. Unsupervised learning techniques are applied to train vector generation module 441. Based on the unsupervised learning techniques, vector generation module 441 generates training vectors 430a-430h and 432a. In some cases, the training vectors are generated based on one or more training attributes of the training element sets, such that semantic content of the training element sets is represented in the training vectors. For example, vector generation module 441 generates training vector 430a based on some or all of the semantic content of training attribute 421a. In some cases, the generated training vector is based on information determined by the vector generation module 441. Additionally or alternatively, the generated training vector is based on additional information, such a namespace associated with the training element set.

In some embodiments, one or more operations related to block 520 are repeated. For example, multiple vector generation modules included in a system, such as system 400, each generate training vectors of the respective training element sets based on multiple respective training parameters. Additionally or alternatively, the respective training vectors generated by each of the multiple vector generation modules are compared, such as by comparing the semantic content represented by the respective training vectors. In some cases, a particular vector generation module having a higher accuracy of represented semantic content (e.g., relative to the other vector generation modules) is selected to generate additional vectors in the system 400.

At block 530, the process 500 involves projecting generated training vectors in a vector space. For example, vector generation module 441 projects training vectors 430*a*-430*h* and 432*a* into vector space 450. In some cases, the training vectors are projected based on the semantic content of the associated training element sets, or the vectors' quantitative representation of the semantic content, or both. For example, vector generation module 441 projects two or more training vectors to respective locations within vector space 450, based on the semantic content of the associated training element sets.

At block 540, the process 500 involves determining a distance between two or more training vectors projected into a vector space. Distance is determined, for example, based on a norm, a cosine similarity, or any other suitable technique. In some cases, data standardization module 440 determines a distance between training vectors projected within vector space 450. Additionally or alternatively, a distance between two or more of the training vectors is compared to a threshold distance.

At block 550, the process 500 involves determining a similarity between training element sets based on the distance between training vectors associated with the training element set. In some cases, the similarity is determined based on a comparison of a threshold distance to a distance between training vectors. For example, vector generation module 441 compares a threshold distance to a distance between training vectors 430*a* and 430*e*. Based on the comparison, vector generation module 441 determines a similarity between training attributes 421*a* and 421*b*. In some cases, operations related to block 550 are repeated, such as to compare a determined distance to one or more additional threshold distances. For example, vector generation module 441 determines a likelihood of similarity between training attributes 421*a* and 421*b*, by comparing the distance between training vectors 430*a* and 430*e* to multiple threshold distances.

At block 560, process 500 involves training a neural network, such as a neural network included in classifier 445, to classify training vectors to a standardized data type. In some cases, classification includes assigning a group of training vectors to a standardized data type. For example, a group is assigned based on one or more of the training vectors in the group being within a threshold distance of each other. Supervised learning techniques, such as one or more support vector networks, are applied to train classifier 445. Based on the supervised learning techniques, classifier 445 assigns multiple training vector groups to respective standardized data types such that each training vector within a particular group is within the threshold distance, and such that a distance between each of the multiple groups (e.g., a distance between training vectors of different groups) is maximized. In some cases, classifier 445 is trained based on training parameters related to the supervised learning techniques.

For example, classifier 445 assigns a group including the training vectors 430*a*, 430*e*, 430*b*, and 430*d* to a standardized data type. The assignment is based on each of the training vectors 430*a*, 430*e*, 430*b*, and 430*d* being within a threshold distance of one or more of the other training vectors in the group. Additionally or alternatively, based on the supervised learning techniques, the assignment is based on additional information associated with training vectors 430*a*, 430*e*, 430*b*, and 430*d*, or the associated training element set 420. For example, classifier 445 assigns training vectors 430*a*, 430*e*, 430*b*, and 430*d* based on additional information indicating a known standardized data type of training element set 420. The additional information is provided, for example, as an additional attribute included in training element set 420, as a data structure (e.g., indicating known standardized data types for multiple training element sets), as an input (e.g., received via a user interface), or via any other suitable format.

In some embodiments, one or more operations related to block 560 are repeated. For example, multiple classifiers included in a system, such as system 400, each assign training vectors to standardized data types based on multiple respective training parameters. Additionally or alternatively, the respective assignments of each of the multiple classifiers are compared, such as by comparing the assigned standardized data type for a group of training vectors to a known standardized data type for that group. In some cases, a particular classifier having a higher assignment accuracy (e.g., relative to the other classifiers) is selected to classify additional vectors in the system 400.

Classification of Input Using Trained System

Figure 6:
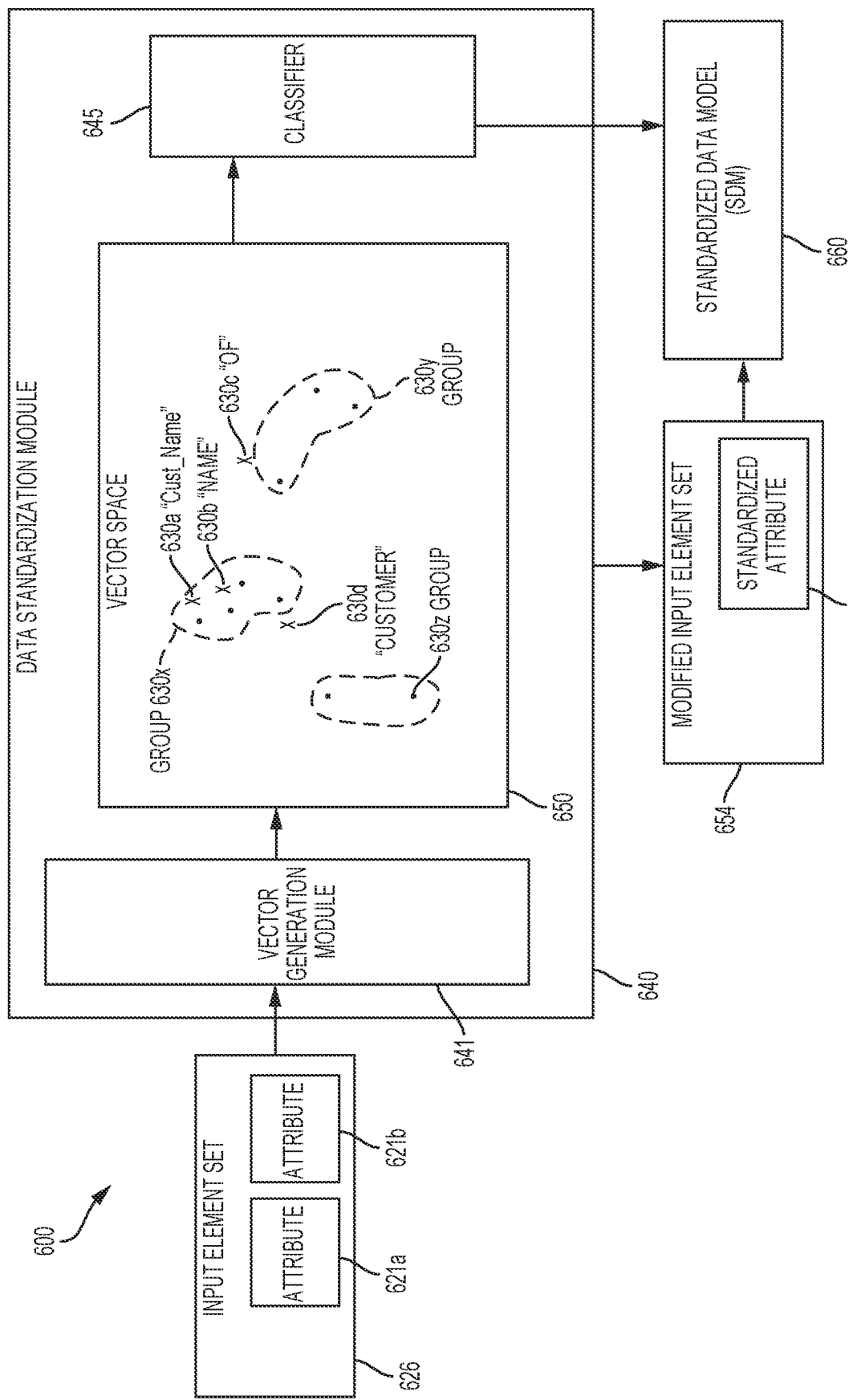
FIG. 6 is a block diagram depicting an example of a system capable of classifying data element sets by one or more trained modules, according to certain embodiments.

FIG. 6 is a block diagram depicting an example of a system 600 in which data element sets are classified by one or more trained modules. In some embodiments, some or all of system 600 is included in a data standardization module, such as data standardization module 660. Additionally or alternatively, portions of system 600 are included in various components, such as components on a network, or in a distributed configuration (e.g., "cloud" configuration), or any other suitable configuration.

In system 600, data standardization module 660 includes one or more trained components, such as vector generation module 641 or classifier 645. Additionally or alternatively, data standardization module 660 includes a vector space 650 including one or more groups of vectors, such as groups 630*x*, 630*y*, and 630*z*. Groups 630*x*, 630*y*, and 630*z* include one or more vectors projected into vector space 650, such as training vectors associated with unsupervised or supervised learning techniques. Additionally or alternatively, the vectors included in groups 630*x*, 630*y*, and 630*z* are assigned to respective standardized data types. For example, group 630*x* includes vectors assigned to a standardized data type indicating information about the given names and family names of a customer.

For convenience, and not by way of limitation, vector space 650 is represented as an area having a height and width. However, other representations are possible, including representation using data structures having a higher dimensionality, or data structures not intended for human interpretation. Also for convenience, and not by way of limitation, vectors in vector space 650 that are assigned to groups (e.g., associated with data element sets already classified) are represented as points, and vectors in vector space 650 that are not assigned to groups are represented as x's.

In system 600, one or more data element sets are received, each data element set having one or more attributes. For example, input element set 626 includes input attributes 621*a* and 621*b*. The input attribute 621*a* includes <Cust_Name> indicating a column header. The input attribute 621*b* includes <Name of customer> indicating a description of the column. Data element sets are received via one or more of a data source or a data mapping module, such as data source 170 or data mapping module 147 described in regards to FIG. 1. In some cases, received data element sets or included attributes are mapped to a standard data schema, as described elsewhere herein.

In some embodiments, a received data element set is transformed into one or more vectors based on the content, such as semantic content, of attributes included in the data element set. For example, data standardization module 640 transforms input element set 626 into input vectors 630a, 630b, 630c, and 630d. Input vector 630a is based on the text item "Cust_Name" included in input attribute 621a. Input vectors 630b-630d are based on the respective text items "Name," "of," and "customer" included in input attribute 621b. In some cases, each of the input vectors 630a-630d indicate a context of the respective vector, or one or more relationships between the input vectors. In some cases, the input vectors are generated based on training techniques. For example, trained vector generation module 641 generates input vectors 630a-630d based on unsupervised learning techniques, as described elsewhere herein. Additionally or alternatively, vector generation module 641 improves a learned technique based on generation of the input vectors 630a-630d. For example, vector generation module 641 improves techniques to generate additional input vectors based on generation of input vector 630a.

In some embodiments, a similarity is determined between an input attribute and another attribute. For example, input vectors 630a-630d are projected into vector space 650. The locations of vectors 630a-630d within vector space 650 are determined based on semantic content of input attributes 621a or 621b. Additionally or alternatively, a similarity between an input attributes and a training attribute is determined based on a distance between respective associated vectors. For example, input vector 630a (e.g., associated with the text item "Cust_Name") is projected into a portion of vector space 650 corresponding to group 630x, which includes one or more training vectors assigned to a standardized data type indicating information about the given and family names of customers. Based on a determined distance between input vector 630a and one or more vectors included in group 630x, vector generation module 641 determines a similarity between input attributes 621a and attributes associated with the vectors included in group 630x (e.g., training attributes 421a and 421b). In some cases, a distance is determined between an input vector and a training vector included in group, or between the input vector and an additional input vector assigned to the group, or both.

In system 600, data standardization module 640 determines a standardized data type for input element sets based on the location of respective input vectors projected into vector space 650. For example, trained classifier 645 determines that input vector 630a is located in a portion of vector space 650 corresponding to group 630x, based on a distance between input vector 630a and one or more vectors included in group 630x. Additionally or alternatively, classifier 645 assigns input vector 630a to the standardized data type associated with group 630x. In some cases, classifier 645 improves a learned technique based on classification of the input vectors 630a-630d. For example, classifier 645 improves techniques to assign additional input vectors based on one or more of classification of input vector 630a, or received feedback regarding the classification of input vector 630a (e.g., such as feedback received as an input via a user interface associated with system 600).

In some embodiments, data standardization module 640 determines a standardized data type for an input element set based on a classification of the respective input vector. For example, data standardization module 640 associates input element set 626 with a standardized data type included in SDM 660. Additionally or alternatively, data standardization module 640 provides a modified input element set based on the determined standardized data type. For example, based on the assignment of input vector 630a to the standardized data type associated with group 630x, data standardization module 640 provides a modified input element set 654. Modified input element set 654 includes an indication of the associated standardized data type. For example, modified input element set 654 includes standardized data type attribute 659.

Figure 7:
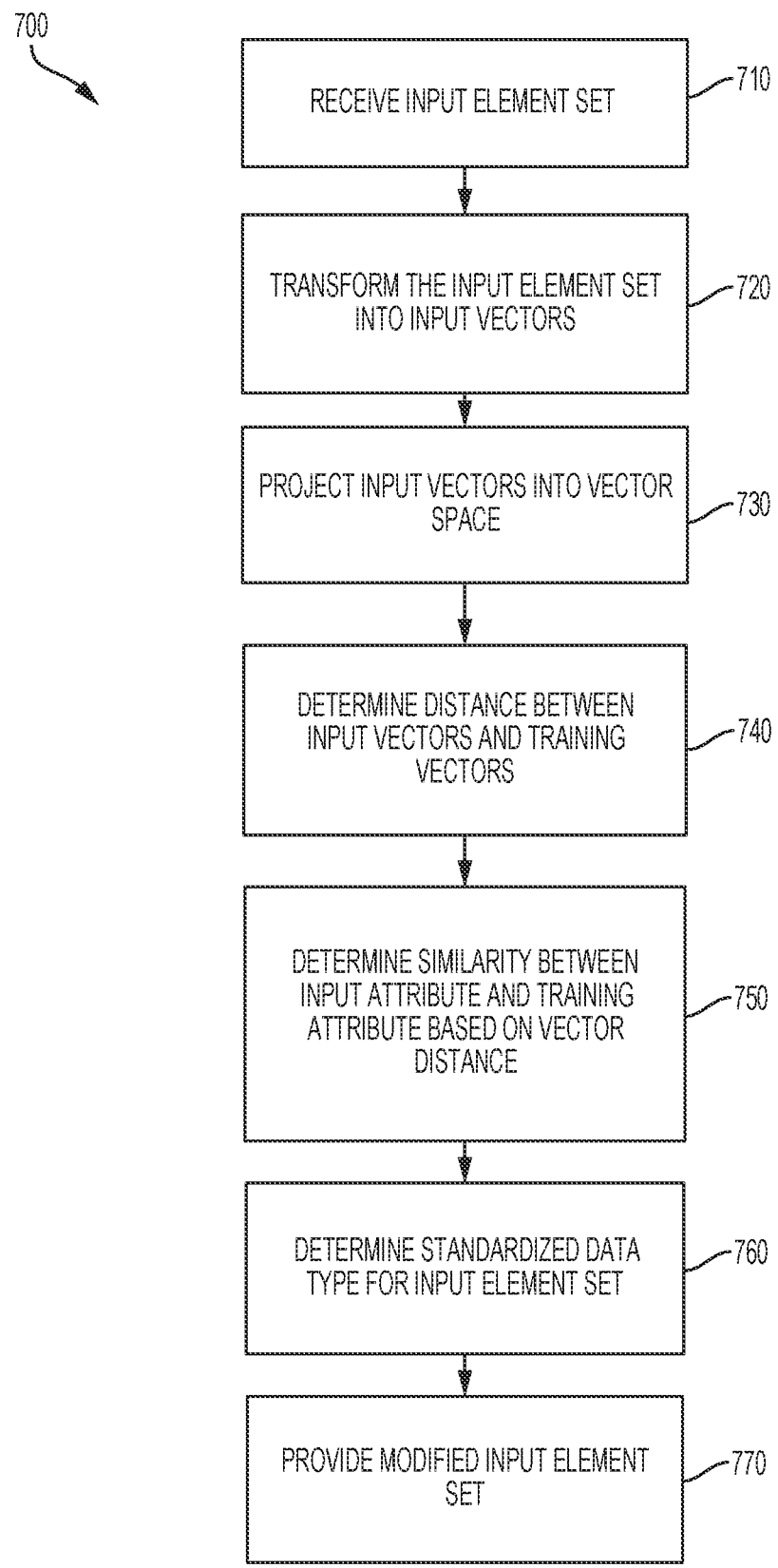
FIG. 7 is a flow chart depicting an example of a process for generating or classifying vectors using one or more trained modules, according to certain embodiments.

FIG. 7 is a flow chart depicting an example of a process 700 for generating vectors, or classifying vectors, or both. In some embodiments, such as described in regards to FIGS. 1-6, a computing device executing a data standardization module, such as data standardization module 640, implements operations described in FIG. 7, by executing suitable program code. For illustrative purposes, the process 700 is described with reference to the examples depicted in FIGS. 1-6. Other implementations, however, are possible.

At block 710, the process 700 involves receiving a data element set, such as an input element set. For example, input element set 626 is received by data standardization module 640. The received input element set includes one or more attributes, such as attributes 621a and 621b included in input element set 626.

At block 720, the process 700 involves transforming the input element set into one or more input vectors. An input vector is based on an attribute of the input element set, or a portion of an attribute. For example, vector generation module 641 transforms input attributes 621a and 621b into input vectors 630a-630d.

At block 730, the process 700 involves projecting the generated input vectors into a vector space. The vector space includes one or more vectors assigned to groups within the vector space. For example, vector space 650 includes vectors already assigned to groups 630x-630z. In some cases, the vectors already assigned to groups within the vector space are associated with training vectors, additional input vectors, or both. Additionally or alternatively, the input vectors are projected based on the semantic content of the associated input element sets, or the input vectors' quantitative representation of the semantic content, or both. For example, vector generation module 641 projects input vectors 630a-630d to respective locations within vector space 450, based on the semantic content of the associated input element set 626.

At block 740, the process 700 involves determining a distance between the projected input vectors and one or more additional vectors within the vector space. For example, one or more of data standardization module 640 or classifier 645 determines a distance between input vector 630a and one or more additional vectors assigned to group 630x. Distance is determined using any suitable technique, such as a vector norm.

At block 750, the process 700 involves determining a similarity between an input attribute and an additional attribute. In some cases, the determined similarity is based on a distance between vectors associated with the respective attributes. For example, a similarity is determined between input attribute 621a and training attribute 421a based on a determined distance between input vector 630a and one or more training vectors, associated with training attribute 421a, that are assigned to group 630x. Additionally or alternatively, the determined similarity is based on a comparison of an input vector and an additional vector. For example, input vector 630a is compared to a training vector assigned to group 630x. The similarity is determined based on any suitable technique, such as a cosine similarity between vectors.

At block 760, process 700 involves determining a standardized data type for the input element set associated with the projected input vectors. In some cases, the standardized data type is determined based on the location of the input vectors in the data space. For example, classifier 645 determines that input vector 630a is located in a portion of vector space 650 that corresponds to group 630x. Responsive to determining the location of the input vector 630a, classifier 645 assigns input vector 630a to the standardized data type associated with group 630x. In some cases, the standardized data type is included in a SDM, such as SDM 660

At block 770, process 700 involves providing a modified input element set based on the determined standardized data type. For example, data standardization module 640 provides a modified input element set 654 based on input element set 626 and the standardized data type to which one or more of input vectors 630a-630d are assigned. In some cases, the modified input element set includes an attribute indicating the determined standardized data type, such as standardized data type attribute 659.

Additional operations related to process 700 are envisioned. In some embodiments, process 700 includes operations related to receiving feedback regarding a determined standardized data type. For example, process 700 includes operations related to one or more of displaying a modified input element set or a standardized data type attribute on a user interface, or receiving feedback via the user interface regarding the determined standardized data type.

Data and System

A data standardization module receives data from one or more data sources. For example, data standardization module 140 receives data from data source 170. In some embodiments, data that is received by a data standardization module includes one or more of duplicated data, non-normalized data, or syntactically diverse data. In some cases data that is duplicative, non-normalized, or syntactically diverse is relatively complicated to use and consumes a relatively large amount of resources on a computing system, such as resources related to processing, transmission, and/or storage. For example, data that is duplicative, non-normalized, or syntactically diverse requires a relatively large amount of storage space, or processing power to perform operations (e.g., running search queries, modifying sets of data), or network bandwidth (e.g., transferring sets of data over one or more networks).

Additionally or alternatively, data that is classified within an SDM is one or more of non-duplicated, normalized, or syntactically unified. For example, data that is classified by a data standardization module 140 is associated with SDM 160. One or more data element sets classified within SDM 160 are associated with a respective standardized data type indicating semantic content. Additionally or alternatively, the non-duplicated, normalized, and syntactically unified data is relatively easy to use and consumes a relatively smaller amount of resources on a computing system. For example, an operation (e.g., running a search query) performed on the data classified within SDM 160 requires a relatively small amount of storage space, or processing power, or network bandwidth.

In some cases, multiple collections of data (e.g. multiple information corpus) are received from multiple respective data sources. For example, a first collection of data (e.g., first corpus) is used to train a vector generation module, such as vector generation module 441. The first data collection includes a relatively large quantity of text (e.g., multiple thousands of words or phrases). In some cases, the text is organized using headers and descriptions (e.g., column headers, column descriptions), and is received from a first data source, such as a website including large quantities of textual information (e.g., an online encyclopedia). In some cases, the first data collection is used in an unsupervised learning technique, such as a recursive neural tensor network, to train a technique to generate word vectors.

Additionally or alternatively, a second collection of data (e.g., second corpus) is used to train a classifier, such as classifier 445. The second data collection includes a relatively small quantity of data element sets (e.g., equal or less than 1000 data element sets) that are associated with a known standardized data type (e.g., data fields, column headers, which are already associated with standardized data types). The second data collection is received from a second data source, such as a networked data source including a set of supervising examples. In some cases, the second data collection is used in a supervised learning technique, such as a support vector network, to train a technique to classify data element sets.

Furthermore, additional data (e.g., unassigned data element sets) is provided to a data standardization module included in a data service platform, such as marketing data platform 110. A data standardization module determines a standardized data type for input element sets included in the additional data, such as standardized data types included in an SDM. The additional data is received from one or more additional data sources, such as from data sources associated with users of marketing data platform 110.

In some embodiments, a data element set is represented by a tuple. Additionally or alternatively, attributes of the data element set are represented by one or more information items included in the tuple. For example, a column header and an associated column description are organized as a tuple, such as the tuple <Column_Name, Column_Description>. In some cases, training data, input data, or both is provided as one or more collections of tuples. For example, training element set 420 is provided as a first tuple <Customer_Name, First and last names of the customer>, wherein the first tuple represents training attributes 421a and 421b. Additionally or alternatively, input element set 626 is provided as a second tuple <Cust_Name, Name of customer>, wherein the second tuple represents input attributes 621b and 621b.

In some cases, a tuple includes additional information. For example, a tuple provided with a collection of training data (e.g., for a supervised learning technique) includes additional information about a known standardized data type, such as. Additionally or alternatively, a tuple provided by a data standardization module (e.g., representing a classified data element set) includes additional information about an assigned standardized data type, such as <Column_Name, Column_Description, Assigned_Std_Data_Type>.

Figure 8:
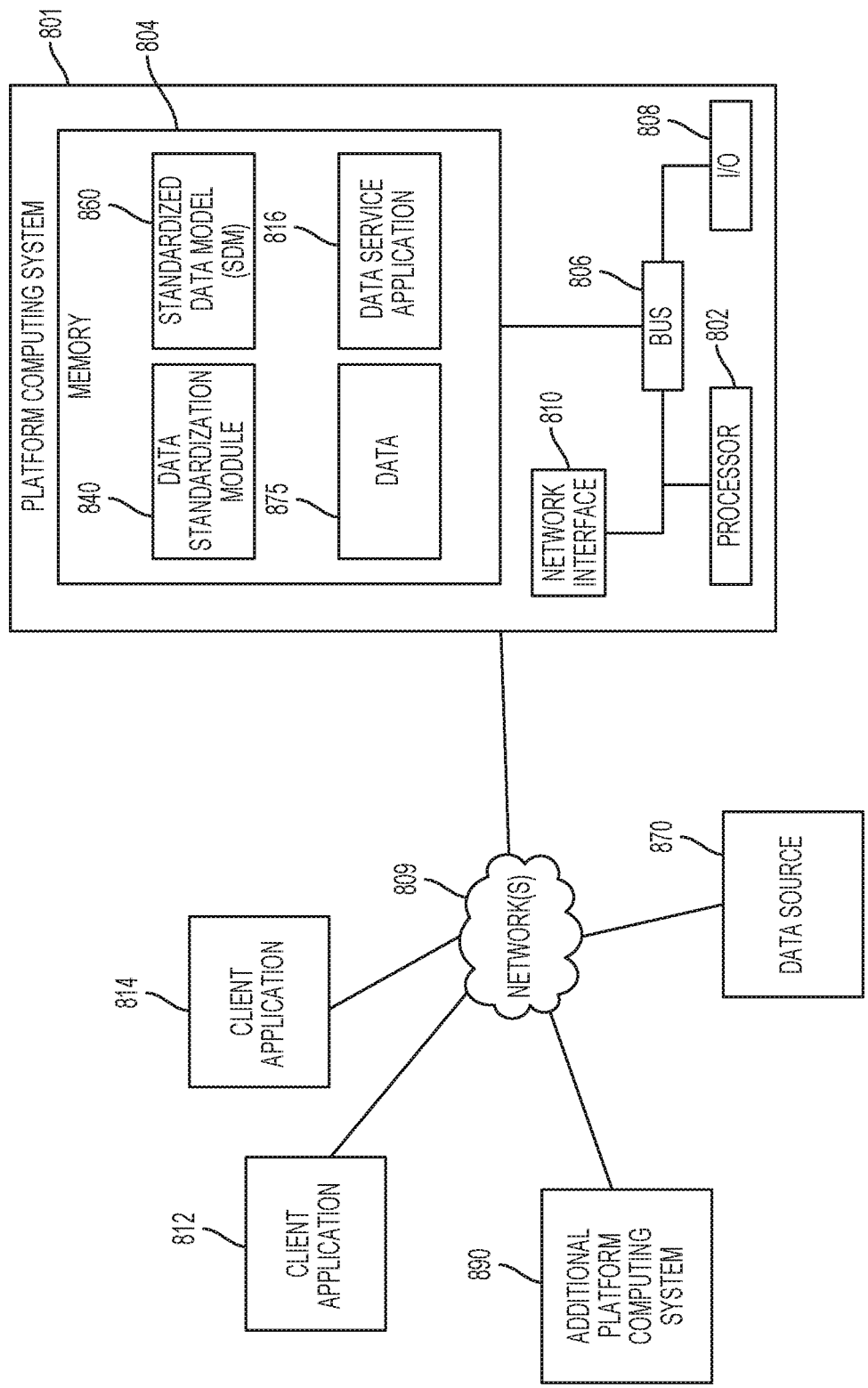
FIG. 8 is a block diagram depicting a computing system capable of hosting one or more portions of a data service platform, according to certain embodiments.

Any suitable computing system or group of computing systems can be used for performing the operations described herein. For example, FIG. 8 is a block diagram depicting a platform computing system 801 capable of hosting one or more portions of a data service platform, such as marketing data platform 110, according to certain embodiments. Portions of the data service platform include, without limitation, some or all of data standardization module 840 (or included components), SDM 860, data 875, data service application 816, or additional components or portions of components. In some embodiments, data standardization module 840 includes one or more elements indicated in FIGS. 1-7, such as data standardization modules 140, 240, 440, or 645, or one or more included components, such as classifiers 145, 245, 445, or 645, vector generation modules 441 or 641, or data mapping modules 147 or 247. Additionally or alternatively, SDM 860, data 875, or data service application 816 include one or more elements indicated in FIGS. 1-7, such as SDMs 160, 260, received data 175*a*, standardized data 175*b*, or other suitable elements.

In some cases, a platform computing system 801 hosts multiple portions of the data service platform, or all portions. Additionally or alternatively, platform computing system 801 hosts a portion of the data service platform, and is capable of communicating with additional computing systems hosting additional portions of the data service platform, such as the additional platform computing system 890.

The depicted example of a platform computing system 801 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing some or all components of the data service platform, such as data standardization module 840 (or included components), SDM 860, the data 875, data service application 816, and other received or determined values or data objects. In some cases, a memory device 804 stores one or more portions of the platform components, and additional portions of the platform components are stored on additional memory devices, such as a memory device operating on additional platform computing system 890. The computer-readable medium of memory device 804 can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The platform computing system 801 may also include a number of external or internal devices such as input or output devices. For example, the platform computing system 801 is shown with an input/output ("I/O") interface 808 that can receive input from input devices or provide output to output devices. A bus 806 can also be included in the platform computing system 801. The bus 806 can communicatively couple one or more components of the platform computing system 801.

The platform computing system 801 executes program code that configures the processor 802 to perform one or more of the operations described above with respect to FIGS. 1-7. The program code includes operations related to, for example, one or more portions of the data standardization module 840 (or included components), SDM 860, the data 875, data service application 816, or other suitable applications or memory structures that perform one or more operations described herein. The program code may be resident in the memory device 804 or any suitable computer-readable medium and may be executed by the processor 802 or any other suitable processor. In some embodiments, some or all of data standardization module 840 (or included components), SDM 860, the data 875, data service application 816, and the program code described above are stored in the memory device 804, as depicted in FIG. 8. In additional or alternative embodiments, one or more portions of data standardization module 840 (or included components), SDM 860, the data 875, data service application 816, and the program code described above are stored in one or more memory devices accessible via a data network, such as a memory device accessible via a cloud service.

The platform computing system 801 depicted in FIG. 8 also includes at least one network interface 810. The network interface 810 includes any device or group of devices suitable for establishing a wired or wireless data connection to one or more data networks 809. Non-limiting examples of the network interface 810 include an Ethernet network adapter, a modem, and/or the like. In some cases, one or more of additional platform computing system 890, data source 870, or client applications 812 or 814 are connected to the platform computing system 801 via network 809. Additionally or alternatively, data source 870 or client applications 812 or 814 include one or more elements indicated in FIGS. 1-7, such as data source 170, client applications 112 or 114, or other suitable elements. In some embodiments, the additional platform computing system 890 performs some of the operations described herein, such as operations related to one or more portions of the data service platform. The platform computing system 801 is able to communicate with one or more of the additional platform computing system 890, data source 870, or client applications 812 or 814 using the network interface 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A non-transitory computer-readable medium embodying program code for mapping datasets to a standardized data model, the program code comprising instructions which, when executed by a processor, cause the processor to perform operations comprising:
accessing training element sets, wherein (i) a first training element set includes a first training attribute and (ii) a second training element set includes a second training attribute, wherein the first training attribute and the second training attribute have a similarity;
training a vector generation module to generate training vectors, wherein a first training vector is based on the first training attribute and a second training vector is based on the second training element set,
projecting the first training vector and the second training vector in a vector space, wherein the first training vector is positioned within the vector space based on the first training attribute and the second training vector is positioned within the vector space based on the second training attribute;
determining the similarity between the first training vector and the second training vector, wherein the similarity is based on a determined distance between the first training vector and the second training vector in the vector space; and
training a classifier to assign the first training vector and the second training vector to a standardized data type, wherein the classifier assigns the first training vector and the second training vector to the standardized data type based on the first training vector and the second training vector being within a threshold distance of each other.

2. The non-transitory computer-readable medium of claim 1, the operations further comprising:
receiving an input element set including an input attribute;
applying the trained vector generation module to generate an input vector based on the input attribute;
projecting the input vector in the vector space based on the input attribute;
determining a similarity between the first training vector and the input vector, wherein the similarity is based on a determined distance between the first training vector and the input vector in the vector space;
applying the trained classifier to the input element set by associating, based on the first training vector and the input vector being within the threshold distance of each other, the input element set with the standardized data type; and
modifying the input element set to have a standardized data type attribute indicating the standardized data type.

3. The non-transitory computer-readable medium of claim 2, the operations further comprising:
receiving an input indicating a correction of the modified input element set, the correction indicating a second standardized attribute type;
responsive to the input indicating the correction, further modifying the input element set to have the second standardized attribute type; and
modifying the classifier to associate an additional input vector generated from an additional input element set with the second standardized attribute type, responsive to determining that the additional input vector being within the threshold distance of the input vector.

4. The non-transitory computer-readable medium of claim 2, the operations further comprising completing a phase of supervised learning, wherein the determining of the similarity between the first training vector and the input vector is further based on the phase of supervised learning.

5. The non-transitory computer-readable medium of claim 1, the operations further comprising completing a phase of unsupervised learning, wherein the first training vector and the second training vector are positioned in the vector space further based on the phase of unsupervised learning.

6. The non-transitory computer-readable medium of claim 1, wherein each of the training element sets includes text data comprising at least one of a name attribute or a description attribute, and each of the training element sets further includes a known attribute type.

7. The non-transitory computer-readable medium of claim 6, wherein the classifier assigns the first training vector and the second training vector to the standardized data type further based on the known attribute type of the first training element set and the known attribute type of the second training element set.

8. The non-transitory computer-readable medium of claim 1, wherein the classifier assigns the first training vector and the second training vector to a group of multiple training vectors, wherein the group is associated with the standardized data type.

9. A method for providing a dataset classified to a standardized data model, the method performed by one or more processing devices and including operations comprising:
accessing training element sets, wherein (i) a first training element set includes a first training attribute and (ii) a second training element set includes a second training attribute, wherein the first training attribute and the second training attribute have a threshold similarity;
transforming the training element sets into training vectors in a vector space, wherein a first training vector for the first training element set and a second training vector for the second training element set are positioned within a threshold distance of each other in the vector space based on the first training attribute and the second training attribute having the threshold similarity;

training a classifier to assign groups of the training vectors to standardized attribute types, wherein the classifier assigns the first training vector and the second training vector to a standardized attribute type based on the first training vector and the second training vector being within the threshold distance of each other;

receiving, from a data source, an input element set having an input attribute;

applying the trained classifier to the input element set by:
  transforming the input element set into an input vector in the vector space,
  determining a distance between the input vector and the first training vector,
  determining, based on the distance between the input vector and the first training vector, that the input vector is in a portion of the vector space corresponding to the first training vector, and
  modifying the input element set to have the standardized attribute type; and
providing the modified input element set to an application requesting the input element set.

10. The method of claim 9, wherein the threshold distance is compared to the distance between the input vector and the first training vector.

11. The method of claim 10, wherein the distance between the input vector and the first training vector is compared to an additional threshold distance, and the method further comprises indicating a likelihood of a similarity between the first training element set and the input element set based on the comparison to the additional threshold distance.

12. The method of claim 9, further comprising completing a phase of unsupervised learning, wherein the first training vector and the second training vector are positioned in the vector space further based on the phase of unsupervised learning.

13. The method of claim 9, further comprising completing a phase of supervised learning, wherein the determining that the input vector is in a portion of the vector space is further based on the phase of supervised learning.

14. The method of claim 9, further comprising:
  receiving an input indicating a correction of the modified input element set, the correction indicating a second standardized attribute type;
  responsive to the input indicating the correction, further modifying the input element set to have the second standardized attribute type; and
  modifying the classifier to assign an additional input vector from an additional input element set to the second standardized attribute type, responsive to determining that the additional input vector being within the threshold distance of the input vector.

15. A system for providing a dataset classified to a standardized data model, the system comprising:
  a means for accessing training element sets, wherein (i) a first training element set includes a first training attribute and (ii) a second training element set includes a second training attribute, wherein the first training attribute and the second training attribute have a threshold similarity;
  a means for transforming the training element sets into training vectors in a vector space, wherein a first training vector for the first training element set and a second training vector for the second training element set are positioned within a threshold distance of each other in the vector space based on the first training attribute and the second training attribute having the threshold similarity;
  a means for training a classifier to assign groups of the training vectors to standardized attribute types, wherein the classifier assigns the first training vector and the second training vector to a standardized attribute type based on the first training vector and the second training vector being within the threshold distance of each other;
  a means for receiving, from a data source, an input element set having an input attribute;
  a means for applying the trained classifier to the input element set by:
    transforming the input element set into an input vector in the vector space,
    determining a distance between the input vector and the first training vector,
    determining, based on the distance between the input vector and the first training vector, that the input vector is in a portion of the vector space corresponding to the first training vector, and
    modifying the input element set to have the standardized attribute type; and
  a means for providing the modified input element set to an application requesting the input element set.

16. The system of claim 15, wherein the threshold distance is compared to the distance between the input vector and the first training vector, wherein the distance between the input vector and the first training vector is compared to an additional threshold distance, and
  the system further comprises a means for indicating a likelihood of a similarity between the first training element set and the input element set based on the comparison to the additional threshold distance.

17. The system of claim 15, further comprising a means for completing a phase of unsupervised learning, wherein the first training vector and the second training vector are positioned in the vector space further based on the phase of unsupervised learning.

18. The system of claim 15, further comprising a means for completing a phase of supervised learning, wherein the determining that the input vector is in a portion of the vector space is further based on the phase of supervised learning.

19. The system of claim 15, further comprising:
  a means for receiving an input indicating a correction of the modified input element set, the correction indicating a second standardized attribute type;
  a means for, responsive to the input indicating the correction, further modifying the input element set to have the second standardized attribute type; and
  a means for modifying the classifier to assign an additional input vector from an additional input element set to the second standardized attribute type, responsive to determining that the additional input vector being within the threshold distance of the input vector.

20. The system of claim 19, further comprising a means for, responsive to the input indicating the correction, updating the standardized data model to include the second standardized attribute type.

* * * * *